(12) United States Patent
Ulrey et al.

(10) Patent No.: US 8,131,453 B2
(45) Date of Patent: *Mar. 6, 2012

(54) METHODS AND SYSTEMS FOR ASSISTED DIRECT START CONTROL

(75) Inventors: Joseph Norman Ulrey, Dearborn, MI (US); Ross Dykstra Pursifull, Dearborn, MI (US); John D. Russell, Portland, OR (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/090,450

(22) Filed: Apr. 20, 2011

(65) Prior Publication Data

US 2011/0192374 A1    Aug. 11, 2011

Related U.S. Application Data

(63) Continuation of application No. 12/692,455, filed on Jan. 22, 2010, now Pat. No. 7,933,711.

(51) Int. Cl.
- *F02N 11/10* (2006.01)
- *F02D 41/16* (2006.01)
- *F02P 5/06* (2006.01)

(52) U.S. Cl. ............... 701/112; 701/113; 123/179.4; 123/179.5; 123/179.16; 123/406.53; 123/198 DC; 123/339.11; 123/443; 123/406.47; 123/680

(58) Field of Classification Search .......... 123/339.11, 123/366, 406.24, 406.25, 406.36, 406.44, 123/406.47, 406.5, 406.53, 436, 680, 691, 123/672, 443, 491, 492, 493, 179.3, 179.4, 123/179.5, 179.7, 179.16, 179.28, 198 DC, 123/480; 701/103–105, 110, 112, 113; 60/274, 60/285–286

See application file for complete search history.

(56) References Cited

U.S. PATENT DOCUMENTS

| | | | |
|---|---|---|---|
| 5,845,486 A | 12/1998 | Yamashita et al. | |
| 6,397,585 B2 | 6/2002 | Kitajima et al. | |
| 6,427,793 B1 | 8/2002 | Hanada et al. | |
| 6,595,307 B2 | 7/2003 | Suzuki | |
| 7,159,561 B1 | 1/2007 | Kerns et al. | |
| 2005/0262827 A1 | 12/2005 | Ichimoto et al. | |
| 2010/0174473 A1 | 7/2010 | Pursifull et al. | |
| 2010/0212294 A1* | 8/2010 | Narayanaswamy et al. | .... 60/285 |

FOREIGN PATENT DOCUMENTS

EP    1350950 A1    10/2003

OTHER PUBLICATIONS

Liu, Xiangying et al., "Methods and Systems for Assisted Direct Start Control," U.S. Appl. No. 12/699,583, filed Feb. 3, 2010, 35 pages.

* cited by examiner

*Primary Examiner* — Hai Huynh
(74) *Attorney, Agent, or Firm* — Allan J. Lippa; Alleman Hall McCoy Russell & Tuttle LLP

(57) ABSTRACT

Methods and systems are provided for expediting engine spin-down in an engine that is shutdown during engine idle-stop conditions and restarted during restart conditions. In one example, the method comprises, during an automatic engine idle-stop, turning off spark, operating a first cylinder with a rich ratio of air to injected fuel richer than a rich flammability limit, operating a second cylinder with a lean ratio of air to injected fuel leaner than a lean flammability limit, and mixing un-combusted exhaust from the first and second cylinders with exhaust, the exhaust mixture being substantially stoichiometric.

18 Claims, 4 Drawing Sheets

METHODS AND SYSTEMS FOR ASSISTED DIRECT START CONTROL

CROSS REFERENCE TO RELATED APPLICATIONS

The present application is a continuation of U.S. patent application Ser. No. 12/692,455 filed Jan. 22, 2010, now U.S. Pat. No. 7,933,711, the entire contents of which are incorporated herein by reference.

FIELD

The present application relates to methods and systems for controlling an engine shutdown and a subsequent engine restart.

BACKGROUND AND SUMMARY

Vehicles have been developed to perform an idle-stop when idle-stop conditions are met and automatically restart the engine when restart conditions are met. Such idle-stop systems enable fuel savings, reduction in exhaust emissions, reduction in noise, and the like. Engines may be restarted from the idle-stop condition in response to a vehicle launch request from the operator, or restarted automatically, without receiving an operator input, for example, in response to engine operating parameters falling outside a desired operating range.

One example approach to shutting down the engine during an idle-stop condition includes shutting off a fuel supply to the cylinders, for example, by performing a deceleration fuel shut-off (DFSO). However, the inventors have recognized several potential issues with such an approach. As one example, following the fuel supply shut-off, the engine may not stop moving immediately and the pistons may continue to pump air through the engine as the engine coasts down. The air pumped through the engine exhaust system may saturate an exhaust catalyst with oxygen and/or reduce the catalyst temperature below its operative range. As such, either situation may necessitate extra fuel to recondition the catalyst during a subsequent restart. The extra fuel constitutes an increase in fuel consumption.

Another example approach for rapidly shutting down the engine during an idle-stop condition is illustrated by Kerns et al. in U.S. Pat. No. 7,159,561. Herein, a shutdown sequence is performed in two phases with a first phase where spark is retarded late into the power stroke, and a second phase where the spark is advanced into the compression stroke. The delayed spark in the first phase allows the engine to be slowed down while the combustion gases are delivered to the catalyst. The advanced spark in the second phase allows the engine to be rapidly stopped by causing a combustion event in the compression stroke. While the approach may address catalyst oxygen saturation and catalyst temperature issues, by putting spark in control, potential misfires or unintended combustions may arise due to ignition system errors and/or degradation. Such results may reduce the chances of a timely engine shutdown.

Further, if a driver has a change of mind while the engine is being shutdown (e.g., still spinning down) and wishes to immediately restart the engine, a desirable fast restart may not be possible. Specifically, the driver may have to wait for the engine to stop rotating completely before the engine starter can be re-engaged. As such, this may substantially increase the restart time and degrade the quality of the restart operation.

Thus, in one example, some of the above issues may be addressed by a method comprising, during an automatic engine idle-stop, turning off spark, and operating a first cylinder with a rich ratio of air to injected fuel richer than a rich flammability limit, and operating a second cylinder with a lean ratio of air to injected fuel leaner than a lean flammability limit. The method may further comprise mixing un-combusted exhaust from the first and second cylinders with exhaust, the exhaust mixture being substantially stoichiometric.

For example, engine shutdown may be expedited by engaging a starter without applying starter current and fueling the engine without spark during an idle-stop operation. By engaging the starter without applying the starter current, engine reversals during engine spin-down may be reduced. In one example embodiment, the engine shutdown may be performed when MAP is at or near atmospheric pressure (or barometric pressure BP). Alternatively, MAP may be adjusted towards BP, for example, using a throttle. As such, a substantially faster engine spin-down may be achieved by initiating the engine shutdown at BP, than at sub-atmospheric pressures.

By fueling the engine without spark during the shutdown, the combustion may occur at the catalyst and not in the cylinder or port. Consequently, an exothermic reaction may be generated at the catalyst to increase catalyst temperature just before engine stop, thereby prolonging the duration that the catalyst remains above the light-off temperature during engine-off. By fueling without spark, unintended combustion in the cylinder may be reduced. Combustion due to accidental sparks may be further reduced by fueling the engine outside the flammability limits of spark. For example, based on engine operating conditions, such as engine speed, engine temperature, and cylinder position, some cylinders may be fueled rich and over the flammability limit while some cylinders may be fueled lean and under the flammability limit. The amount of fuel injected into each cylinder (that is, a degree of leanness or richness) may be adjusted such that the air-fuel ratio of the final exhaust mixture directed through the catalyst is stoichiometric. Then, during a subsequent engine restart, the engine may be controlled based on the catalyst temperature and/or exhaust air-fuel ratio.

In this way, engine shutdown may be expedited, thereby reducing the amount of oxygen pumped through the catalyst. By reducing the amount of air pumped through the catalyst, the amount of fuel needed to condition the catalyst during the subsequent engine restart may be decreased, thereby improving fuel economy. By temporarily raising the catalyst temperature at the time of shutdown, the duration during engine-off that the catalyst remains above the light-off temperature may be extended. Further, by combusting at the catalyst, oxygen saturation of the catalyst may be reduced. In this way, the incidence of engine restart responsive to low catalyst temperatures may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
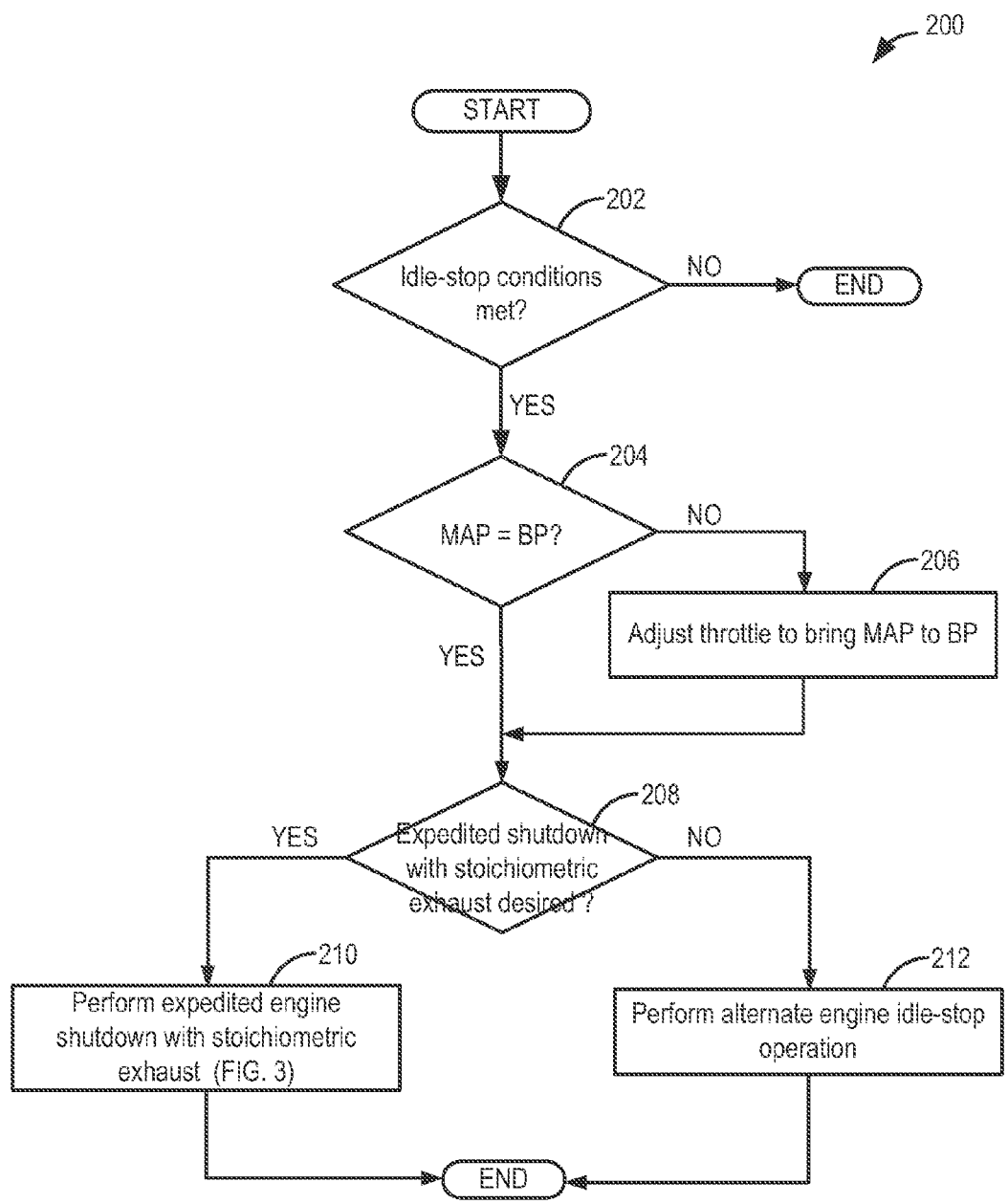
FIG. 2 shows a high level flow chart for executing an engine idle-stop operation, according to the present disclosure.
Figure 3:
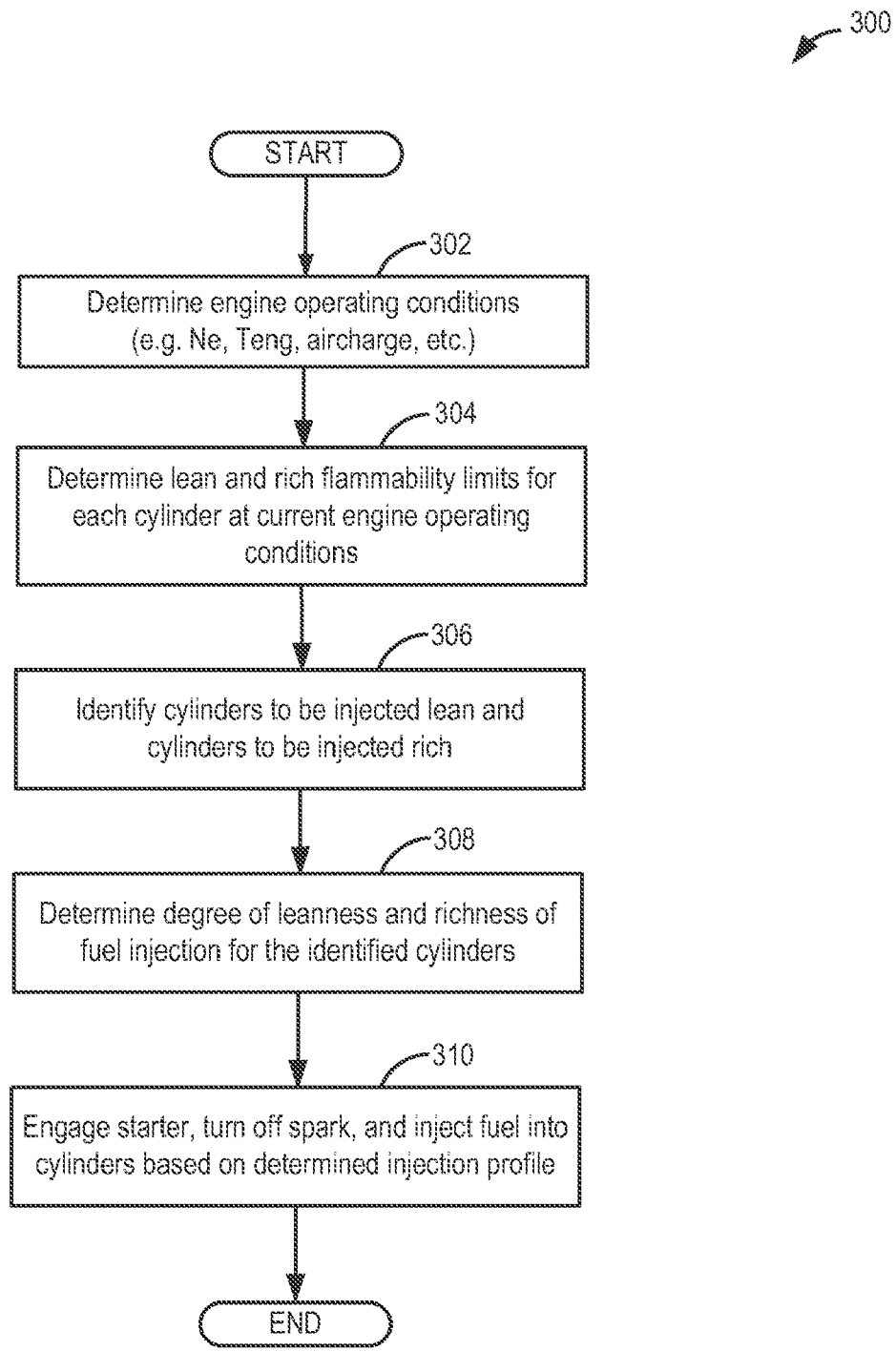
FIG. 3 shows a high level flow chart for executing an expedited engine shutdown.

The following description relates to systems and methods for performing an expedited engine shutdown with stoichiometric exhaust to expedite engine spin-down during an idle-stop, and prolong elevated catalyst temperature conditions during the shutdown. In response to idle-stop conditions, an engine controller may be configured to engage a starter, without applying starter current, to apply an anti-reversal torque on the rotating engine. The controller may also adjust a throttle position to thereby raise manifold pressure closer to barometric pressure (FIG. 2). In one example, the controller may further adjust fuel injection and spark timing to perform an expedited shutdown with stoichiometric exhaust. Herein, as shown in FIG. 3, fuel injection to each cylinder of the engine may be adjusted based on individual cylinder flammability limits. For example, some cylinders may be rich injected while some cylinders are lean injected, the injections adjusted such that that the final exhaust is stoichiometric. During a subsequent engine restart from idle-stop (FIG. 4), the engine may be restarted with starter motor assistance, and fuel injection may be adjusted based on the preceding shutdown operation.

In this way, a braking torque may be applied by the engaged starter to expedite engine spin-down, while fueling outside flammability limits of the cylinders may be used to temporarily raise catalyst temperatures during the shutdown. By extending the time during engine-off that the catalyst temperature remains above a threshold (such as a light-off temperature), engine restarts due to low catalyst temperature conditions may be reduced. By turning off spark, and further, by adjusting fuel injection outside the flammability limits of the engine, the dependence on spark control may be reduced, while also reducing the possibility of misfires due to accidental sparks. By expediting engine spin-down, the amount of air pumped through the catalyst at shutdown may also be reduced. By adjusting the throttle to enable a higher MAP at engine-off, engine spin-down may be expedited while engaging a starter during the engine spin-down enables engine reversals during the spin-down to be reduced. By reducing engine reversals, an engine position may be better estimated during a subsequent engine restart. For example, the engine position may be better estimated even using low cost sensors. Additionally, by preventing engine reversal, tangible NVH benefits may also be achieved. In this way, the quality of engine shutdowns and subsequent restarts may be improved.

Figure 1:
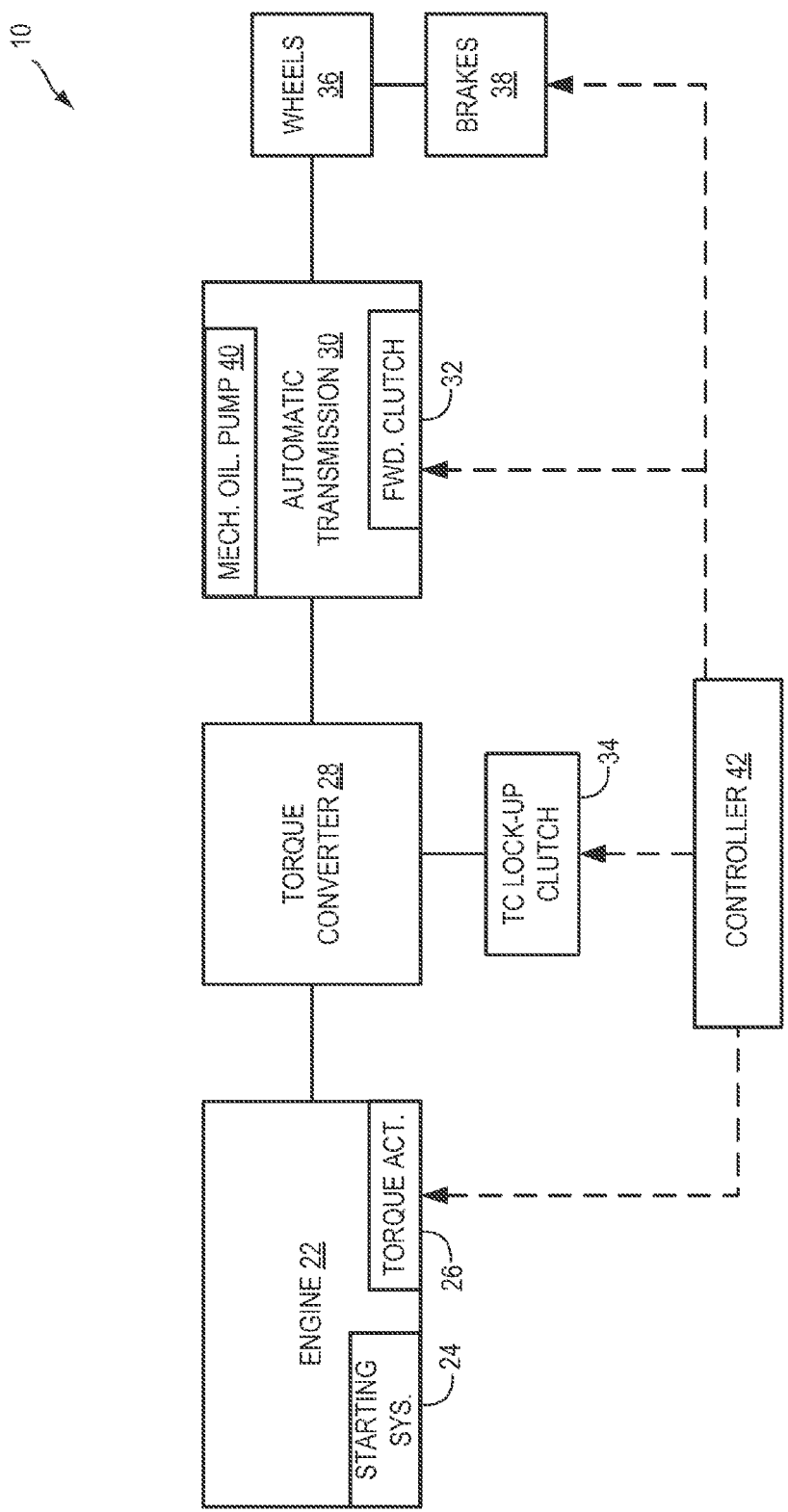
FIG. 1 shows an example vehicle drive-train.

FIG. 1 shows a block diagram layout of a vehicle drive-train 10. Drive-train 10 may be powered by engine 22. In one example, engine 22 may be a gasoline engine. In alternate embodiments, other engine configurations may be employed, for example a diesel engine. Engine 22 may be started with an engine starting system 24, including a starter. In one example, the starter may be a motor-driven (or battery-driven) starter. In another example, the starter may be a powertrain drive motor, such as a hybrid powerplant connected to the engine by way of a coupling device. The coupling device may include a transmission, one or more gears, and/or any other suitable coupling device. The starter may include, for example, a one-way clutch. Engine 22 may further generate or adjust torque via torque actuator 26, such as a fuel injector, throttle, etc. Additionally, in the case of a hybrid vehicle, the powertrain may be used to slow or speed the engine, as desired.

An engine output torque may be transmitted to torque converter 28 to drive an automatic transmission 30 by engaging one or more clutches, including forward clutch 32, where the torque converter may be referred to as a component of the transmission. As such, a plurality of such clutches may be engaged, as needed. The output of the torque converter may in turn be controlled by torque converter lock-up clutch 34. When torque converter lock-up clutch 34 is fully disengaged, torque converter 28 transmits torque to automatic transmission 30 via fluid transfer between the torque converter turbine and torque converter impeller, thereby enabling torque multiplication. In contrast, when torque converter lock-up clutch 34 is fully engaged, the engine output torque is directly transferred via the torque converter 28 clutch to an input shaft (not shown) of transmission 30. Alternatively, the torque converter lock-up clutch 34 may be partially engaged, thereby enabling the amount of torque relayed to the transmission to be adjusted. A controller 42 may be configured to adjust the amount of torque transmitted by the torque converter by adjusting the torque converter lock-up clutch in response to various engine operating conditions, or based on a driver-based engine operation request.

Torque output from the automatic transmission 30 may in turn be relayed to wheels 36 to propel the vehicle. Specifically, automatic transmission 30 may adjust an input driving torque at the input shaft (not shown) responsive to a vehicle traveling condition before transmitting an output driving torque to the wheels. Further, wheels 36 may be locked by engaging wheel brakes 38. In one example, wheel brakes 38 may be engaged in response to the driver pressing his foot on a brake pedal (not shown). In the same way, wheels 36 may be unlocked by disengaging wheel brakes 38 in response to the driver releasing his foot from the brake pedal.

A mechanical oil pump 40 may be in fluid communication with the automatic transmission 30 to provide hydraulic pressure to engage the various clutches, such as forward clutch 32 and/or torque converter lock-up clutch 34. Mechanical oil pump 40 may be operated in accordance with torque converter 28, and may be driven by the rotation of engine 22 or the transmission input shaft, for example. Thus, the hydraulic pressure generated in the mechanical oil pump may increase as an engine speed increases, and may decrease as an engine speed decreases. In some embodiments, an electric oil pump may also be included, the electric oil pump also in fluid communication with the automatic transmission 30 but operating independent from the driving force of the engine 22 or transmission 30, to supplement the hydraulic pressure of mechanical oil pump 40.

Controller 42 may be configured to receive inputs from engine 22 and accordingly control a torque output of the engine and/or operation of the torque converter, transmission, and/or related clutches. As one example, a torque output may be controlled by adjusting a combination of spark timing, fuel pulse width, fuel pulse timing, and/or air charge, by controlling throttle opening and/or valve timing, valve lift and boost for turbocharged engines. In the case of a diesel engine, controller 42 may control the engine torque output by controlling a combination of fuel pulse width, fuel pulse timing, and air charge. In all cases, engine control may be performed on a cylinder-by-cylinder basis to control the engine torque output.

When idle-stop conditions are satisfied, controller 42 may adjust an engine throttle to bring manifold air pressures (MAP) towards barometric pressure (BP), to assist engine spin-down. Further, with the higher MAP, the starter may be engaged to the rotating engine to apply a braking torque and/or provide engine spin-down with reduced engine reversal. Then, fuel injection and/or spark timing may be adjusted, as further elaborated with reference to FIGS. 2-3, to enable an expedited engine shutdown, for example, with stoichiometric exhaust. Herein, spark may be turned off and an amount of fuel injected into each cylinder may be adjusted based on respective flammability limits. Individual cylinder flammability limits may be determined based on the prevalent engine operating conditions, such as an engine speed and/or an engine (or cylinder) temperature at the time of injection. Accordingly, some cylinders may be injected rich while others are injected lean. The fuel injections may be adjusted to maintain exhaust air-fuel ratio at stoichiometry. Alternatively, an engine shutdown without stoichiometric exhaust, for example, by grossly retarding spark may be performed. By grossly retarding spark, an amount of air pumped through the catalyst may be reduced. During a subsequent engine restart from the idle-stop, the engine may be cranked with the starter. As elaborated with reference to FIG. 4, the controller may then adjust fuel injection to the cylinders based on whether fueling outside flammability limits occurred on the immediately preceding idle-stop.

Now turning to FIG. 2, a routine 200 is described for performing an idle-stop operation in the vehicle system of FIG. 1. At 202, it is confirmed if idle-stop conditions have been met. Idle-stop conditions may include, for example, the engine operating (e.g., carrying out combustion), the battery state of charge being above a threshold (e.g., more than 30%), vehicle speed being below a threshold (e.g., no more than 30 mph), no request for air conditioning being made, engine temperature (for example, as inferred from an engine coolant temperature) being above a threshold, no start being requested by the vehicle driver, driver requested torque being below a threshold, brake pedals being pressed, etc. If idle-stop conditions are not met, the routine may end. However, if any or all of the idle-stop conditions are met, then at 204, the controller may estimate intake manifold air pressure (MAP) and confirm that MAP is at barometric pressure (BP). If MAP is not at BP, at 206, the controller may adjust the throttle to bring MAP to or toward BP, for example by reducing throttling of the throttle plate. In one example, the throttle adjustment may include increasing a throttle opening during the idle-stop. In alternate embodiments, MAP may be brought toward BP using additional, or alternate, engine actuators.

If MAP is at or adjusted towards BP, then at 208, the routine may determine if an expedited engine shutdown with stoichiometric exhaust is desired and/or is possible. As such, an expedited engine shutdown may be desired in response to an automatic engine restart prediction (e.g., the current shutdown is an automatic engine idle-stop independent of a shutdown request by the driver), and/or based on engine idle-stop and restart history. For example, if the engine has performed a threshold number of engine idle-stops and restarts in a defined time interval, in anticipation of frequent engine restarts, engine shutdown may be expedited. In still another example, if the duration of a previous shutdown or shutdowns has been less than a threshold, engine shutdown may be expedited in anticipation of frequent restarts. In yet another example, during city driving (for example, as inferred from a GPS sensor, or other traffic sensor), specifically during stop-and-go travel, an expedited engine shutdown may be desired.

Engine shutdown may be expedited with or without stoichiometric exhaust. In one example, an expedited engine shutdown with stoichiometric exhaust may be desired based on catalyst temperature. For example, when catalyst temperature at engine shutdown is below a threshold (for example, below a catalyst light-off temperature), an expedited engine shutdown with stoichiometric exhaust may be desired to address the catalyst temperature issues along with the idle-stop. Herein, by performing an expedited engine shutdown with stoichiometric exhaust, the catalyst temperature may be raised during the idle-stop operation.

If an expedited engine shutdown is desired, then at 210, an expedited engine shutdown with stoichiometric exhaust operation may be performed. As further elaborated in FIG. 3, the controller may adjust fuel injection and spark timing to expedite engine shutdown. For example, an expedited engine shutdown with stoichiometric exhaust may be performed by turning off spark (or not turning off spark) and injecting fuel into one or more engine cylinders outside the flammability limits of each cylinder so that any reaction between air and fuel occurs in the exhaust, substantially outside the engine cylinders. Injecting outside the flammability limits may include fueling lean cylinders leaner than a lean flammability limit, and fueling rich cylinders richer than a rich flammability limit.

If an expedited engine shutdown with stoichiometric request is not desired, then at 212, an alternate engine idle-stop operation may be performed. For example, an alternate expedited engine shutdown (without stoichiometric exhaust) may be performed. In one example, an alternate expedited engine shutdown may be performed due to a shorter shutdown time than the expedited engine shutdown with stoichiometric exhaust. In another example, an alternate expedited engine shutdown may be performed when an expedited engine shutdown with stoichiometric exhaust operation is limited. For example, due to low fuel pump pressure, fuel injection during the expedited engine shutdown with stoichiometric exhaust may be restricted.

In one example, the alternate expedited engine shutdown may include engaging the starter without applying starter current to applying a braking and/or anti-reversal torque on the spinning engine, and fueling the engine at stoichiometry while spark is turned off. Herein, the ignition event may occur at the catalyst and not in the cylinder or in the port, thereby temporarily heating the catalyst during engine-off. In another example, the alternate expedited engine shutdown may include, engaging the starter to apply a braking and/or anti-reversal torque and grossly retarding spark so that an additional negative braking torque is generated to further slow the engine. As such, this allows spark timing to be used for controlling the ignition event. For example, the spark timing may be adjusted so that the ignition event is delayed into the power stroke.

In still other embodiments, an engine idle-stop operation (e.g., non-expedited) may be performed at 212. In one example, this may include deactivating the engine by shutting off fuel (for example, using a deceleration fuel shut-off operation) and/or spark to the engine. The engine may then be maintained in the idle-stop state until an engine restart request is made by the driver, and/or until an engine operating parameter falls outside the desired operating range.

Now turning to FIG. 3, an example routine 300 for performing an expedited engine shutdown with stoichiometric exhaust is shown. The routine may be used in response to engine idle-stop conditions, when an expedited engine shutdown with stoichiometric exhaust is desired and possible (i.e., not restricted). By enabling a rapid engine spin-down, the time required for a subsequent engine restart may be substantially reduced. For example, the time required to restart an engine in response to a driver's change of mind, such as a restart requested during the engine spin-down, may be reduced.

At 302, engine operating conditions may be determined. These may include, for example, engine speed (Ne), engine temperature (Teng), exhaust temperature, engine aircharge, etc. At 304, individual cylinder lean and rich flammability limits may be determined for each cylinder based on the determined prevalent engine operating conditions. In one example, the engine controller may use a look-up table to determine lean and rich flammability limits for each cylinder based on the determined engine operating conditions, e.g., based on cylinder charge, charge temperature, engine speed, etc.

At 306, one or more cylinders may be selected for a rich injection and one or more cylinders may be selected for a lean injection, the selections based on individual cylinder flammability limits, and further based on engine configuration (for example, based on whether the engine is a V-engine or an in-line engine). The fuel injection may be adjusted such that the mixed exhaust is at stoichiometry. For example, if the lean flammability limit is farther from stoichiometry than the rich flammability limit, a greater number of cylinders may be selected to operate rich, compared to a lesser number of cylinders selected to operate lean, in order to more easily obtain a mixed air-fuel ratio of approximately stoichiometry. As another example, if the lean and rich flammability limits are of similar distance from stoichiometry, then an equal number of cylinders may be selected to run lean (leaner than the lean flammability limit) as compared to the number of cylinders selected to run rich (richer than the rich flammability limit). The selections may be further based on a number of predicted combustion events to reach a minimum engine speed, for example, a number of events available before the engine stops. Further, still other approaches may be used.

Thus, in one example, the engine may be an I-4 engine, and based on the engine flammability limits, it may be determined that engine shutdown may be expedited while maintaining the exhaust at stoichiometry by injecting one cylinder rich and injecting the remaining three cylinders lean.

At 308, the routine may include, determining a degree of leanness and a degree of richness for the individual cylinder fuel injections. Thus, leanness may be determined for the cylinders selected for a lean fuel injection (leaner than the lean flammability limit) and richness may be determined for the cylinders selected for a rich fuel injection (richer than the rich flammability limit). The leanness and/or richness outside flammability limits for the engine cylinders may be adjusted based, for example, a number of cylinders operating lean and a number of cylinders operating rich, the flammability limits of each cylinder, a number of combustion events predicted to reach a minimum speed, (for example, a number of events available before the engine stops), etc. The leanness and/or richness may additionally be based on engine operating conditions, such as an engine temperature or engine speed.

For example, if two cylinders are to be fueled leaner than the lean flammability limit and two cylinders are to be fueled richer than the rich flammability limit, the routine may determine the lean and rich amounts such that the mixture of all four cylinders is substantially stoichiometric (for example within one air-fuel ratio of stoichiometric). Herein, adjusting a degree of richness and leanness of the cylinders based on the number of cylinders may include, in one example, selecting a rich air-fuel ratio (richer than the rich flammability limit) and then determining the lean air-fuel ratio based on the number of cylinders and the selected rich air-fuel ratio. Then, the routine may further include checking to confirm that the determined lean air-fuel ratio is also leaner than the lean flammability limit. If not, the calculations may be reiterated to select an air-fuel ratio that may be more rich, until a sufficiently lean air-fuel ratio results. As such, the lean and rich air-fuel ratios may be adjusted more lean and more rich concurrently until each is past its respective flammability limit.

Such determinations may be performed using the following example equations. For example, a stoichiometric exhaust may be computed for the lean and rich cylinder using equation (A) as below, by solving the equation for an air-fuel ratio of the mixture stoichiometry ($AF_{mix}$ at 14.7), $$AF_{mix} = (A_L * \#_L + A_R * \#_R) / (F_L * \#_L + F_R * \#_R) \quad (A)$$

wherein $A_L$ is the aircharge to the lean cylinders, $A_R$ is the aircharge to the rich cylinders, $F_L$ is the fuel injected to the lean cylinders, $F_R$ is the fuel injected to the rich cylinders, $\#_L$ is the number of lean cylinders, and $\#_R$ is the number of rich cylinders.

Assuming that the aircharge delivered to the lean cylinders is the same as the aircharge delivered to the rich cylinders, that is, an intake aircharge $A_C$, which may in turn be inferred from MAF and engine speed, we can insert $A_L = A_R = A_C$ into equation (A) to get equation (B) as follows, $$AF_{mix} = (A_C * \#_L + A_C * \#_R) / (F_L * \#_L + F_R * \#_R) \quad (B)$$

Further assuming that the sum of the number of rich cylinders and the number of lean cylinders equals a total number of cylinders ($\#_T$), we can insert $\#_L + \#_R = \#_T$ into equation (B) to get equation (C) as follows, $$AF_{mix} = (A_C * \#_T) / (F_L * \#_L + F_R * \#_R) \quad (C)$$

The amount of fuel rich injected into the rich cylinders (outside the rich flammability limits) may be determined from the rich air-fuel ratio selected for the rich cylinders, as shown in equation (D) below, $$F_R = (A_R / AF_{FLR}) \quad (D)$$

wherein $AF_{FLR}$ is the selected air-fuel ratio for the rich cylinders, outside the rich flammability limits of the rich cylinders.

By inserting $F_R$ from equation (D) into equation (C), $F_L$ can be solved as follows in equation (E), $$F_L = [\{(A_C * \#_T) / AF_{mix}\} - \{(A_C * \#_R / AF_{FLR})\}] / \#_L \quad (E)$$

Upon solving for $F_L$, a controller may be confirm that the air-fuel ratio for the lean cylinders ($AF_{FLL}$) is outside the lean flammability limits, as follows in equation (F), $$AF_{FLL} = (A_L / F_L) \quad (F)$$

Thus, a controller may operate a first cylinder with rich ratio of air to injected fuel richer than the rich flammability limit while operating a second cylinder with a lean ratio of air to injected fuel leaner than the lean flammability limit. That is, the first cylinder may be fueled richer than the rich flammability limit, and the second cylinder may be fueled leaner than the lean flammability limit. The un-combusted exhaust from the first and second cylinders may then be mixed with exhaust, the final exhaust mixture being substantially stoichiometric. Specifically, the ratio of a total air in the first and second cylinders to a total injected fuel in the first and second cylinders may be adjusted to be substantially stoichiometric. In one example, the controller may be a control system having computer readable storage medium with code therein, the code carrying instructions for operating the cylinders outside their flammability limits.

In this way, using the above-mentioned equations, an injection profile may be determined for the engine cylinders to enable an expedited engine shutdown with stoichiometric exhaust, while also ensuring that even if an errant spark occurs, or some other ignition source is present, combustion in the cylinder (and torque generation) is substantially avoided as the mixtures (lean or rich) in the cylinders are beyond their flammability limits. As such, the engine can decelerate toward rest while maintaining a stoichiometric exhaust mixture, and while ensuring that ignition is avoided in the cylinders even if an errant spark or other ignition source is present. It will be appreciated that while the depicted example includes an injection profile enabling exhaust to be maintained at stoichiometry, in alternate examples, the injection profile may be adjusted to achieve an alternate exhaust air-fuel ratio, for example, a lean or rich exhaust.

Following determination of an injection profile for the cylinders, at 310, an engine starter may be engaged to the rotating engine without applying a starter current. In this way, an anti-reversal torque may be applied by the starter on the spinning engine to assist engine spin-down by reducing engine reversals. By reducing engine reversal, an engine position may be better estimated during a subsequent engine restart, thereby improving the quality of engine restarts. For example, the engine position may be better estimated even using low cost sensor sets. By reducing the need for expensive engine position sensors, component cost reduction benefits may also be achieved. Further, by preventing engine reversals, substantial NVH benefits may also be attained.

Additionally at 310, ignition (e.g., spark) can be disabled in the cylinders and fuel may be injected into the cylinders based on the determined injection profile. By fueling the engine cylinders based on the injection profile at the higher system MAP, while turning off spark, fuel injection and spark control may be adjusted to expedite engine shutdown while maintaining exhaust at a desired air-fuel ratio.

Figure 4:
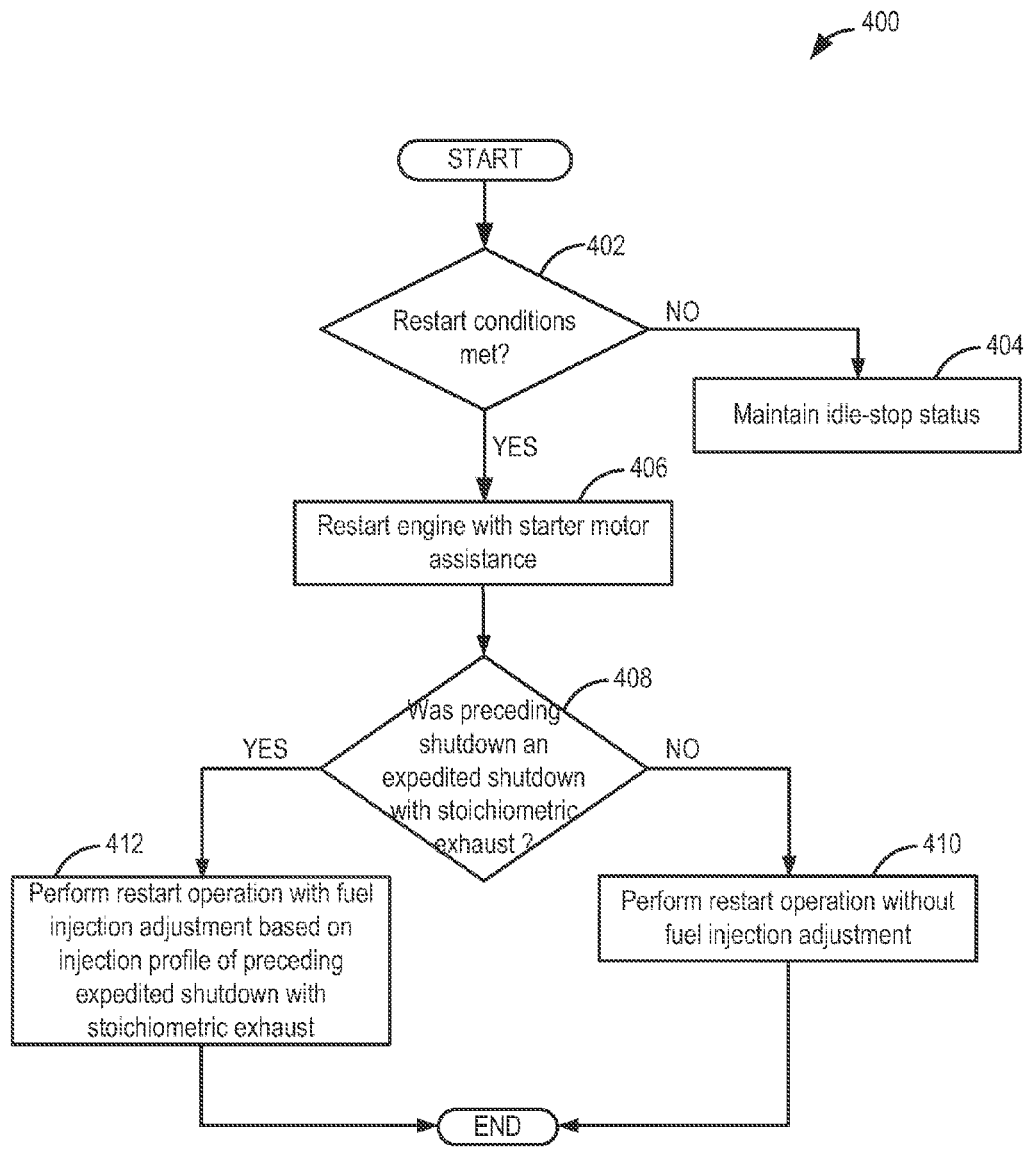
FIG. 4 shows a high level flow chart for executing a restart operation following the idle-stop operation of FIG. 2.

FIG. 4 depicts an example routine 400 for selectively reactivating an engine during an engine restart condition. Specifically, the routine enables fuel injection in the restart operation to be adjusted based on the preceding idle-stop operation.

At 402, it is confirmed if restart conditions have been met. Restart conditions may include, for example, the engine being in idle-stop (e.g., not carrying out combustion), the battery state of charge being below a threshold (e.g., less than 30%), vehicle speed being above a threshold, a request for air conditioning being made, engine temperature being below a threshold, emission control device temperature being below a threshold (e.g., below a light-off temperature), driver requested torque being above a threshold, vehicle electrical load being above a threshold, brake pedals being released, accelerator pedal being pressed, etc. If restart conditions are not met, at 404, the engine may be maintained in the idle-stop status.

In comparison, if any or all of the restart conditions are met, then at 406, the engine may be restarted with starter motor assistance. This may include, cranking the engine with the starter system. The routine may then include adjusting a fuel injection to the cylinders based on whether the immediately preceding idle-stop included fueling outside the flammability limits. Specifically, at 408, it may be determined whether the preceding shutdown was an expedited shutdown with stoichiometric exhaust. If the preceding shutdown was not an expedited shutdown with stoichiometric exhaust, at 410, the engine may be restarted and fueling may be resumed without an additional fuel injection adjustment. However, if the immediately preceding idle-stop was an expedited shutdown with fueling outside flammability limits, at 412, a restart operation may be performed with a fuel injection adjustment, the adjustment based on the injection profile (e.g., number of lean and/or rich cylinders, and a degree of leanness and/or richness of each cylinder operation) of the preceding shutdown.

In one example, the cylinders that had been rich injected during the preceding shutdown may be lean injected during the following restart while cylinders that had been lean injected during the preceding shutdown may be rich injected during the following restart. For example, the routine may include fueling rich injected cylinders that were rich injected during the preceding idle-stop less rich during the following restart, and fueling cylinders that were lean injected during the preceding idle-stop more rich during the following restart. In this way, by making fuel injection adjustments to the cylinders during an engine restart based on fuel injection to the cylinders during a preceding idle-stop operation, exhaust air-fuel ratios may be maintained and the quality of engine restarts may be improved.

For example, during a first shutdown responsive to idle-stop conditions, an alternate expedited shutdown (that is, not an expedited shutdown with stoichiometric exhaust) may be performed. Herein, an expedited engine shutdown with stoichiometric exhaust may not be desired, for example, due to a previous shutdown duration being less than a threshold, due to the catalyst temperature being sufficiently high, or in anticipation of a high likelihood of a driver change of mind. During a restart following the alternate expedited shutdown, the air-fuel ratio of one or more of the initial combustions during cranking or run-up may be adjusted (e.g., by adjusting the fuel injections) to be at a first air-fuel ratio.

During a second shutdown responsive to idle-stop conditions, an expedited shutdown with stoichiometric exhaust may be performed. Herein, an expedited engine shutdown with stoichiometric exhaust may be desired, for example, due to a previous shutdown duration being greater than a threshold, due to the catalyst temperature being below a threshold, or in anticipation of a lower likelihood of a driver change of mind. Based on engine operating conditions and flammability limits for each cylinder, a controller may select 1 cylinder to be lean injected (e.g., very lean injected) leaner than the lean flammability limit, and 3 cylinders to be rich injected richer than the rich flammability limit. Thus, all cylinders may be fueled outside their flammability limits. In one example, each cylinder may be accordingly lean or rich fueled until the engine speed is less than a threshold (e.g., 20 rpm). In one example, based on the number of combustion events available before the engine speed reaches the threshold, each cylinder may be fueled twice.

As such, it may not be desirable to fuel a cylinder unless it is able to go through a complete combustion cycle to reduce the possibility of unburned fuel being left in the cylinder. Thus, based on a number of combustion events available before engine stop (or before a minimum engine speed is reached), the fueling may be adjusted. For example, after turning off spark, a controller may predict 10 cylinder events before engine stop. In one example, based on the flammability limits and based on the 10 cylinder event prediction, the controller may select 2 cylinders for a lean injection and 2 cylinders for a rich injection, and further, may alternate lean and rich injections so that the final exhaust mixture at the time of engine stop is at or near stiochiometry. In comparison, if a controller selects 3 cylinders for a lean injection and 1 cylinder for a rich injection, the leanness and richness of the injections and the order of injection may be adjusted so that the exhaust mixture at the time of engine stop (i.e, following the $10^{th}$ combustion event) is at or near stoichiometry. Alternatively, the controller may inject the lean and rich cylinders for the first 8 combustion events, and stop fuel injection during the last 2 combustion events to avoid air-fuel ratio variations and incomplete combustions.

During a restart following the expedited shutdown with fueling outside cylinder flammability limits, the air-fuel ratio of one or more of the initial combustions during cranking or run-up may be adjusted (e.g., by adjusting the fuel injections) to be at a second air-fuel ratio that is less rich (or more lean) than the first air-fuel ratio.

In this way, during an engine idle-stop, a starter may be engaged at high engine MAP (for example, at or close to BP), to enable rapid engine spin-down. By also turning off spark and fueling engine cylinders outside their flammability limits during the idle-stop, cylinder combustion may be stopped while the engine spins down. By expediting engine shutdown, the oxygen saturation of an emission catalyst during the shutdown may be reduced while also reducing the amount of time between an idle-stop operation and a subsequent restart in response to frequent restart requests. By removing spark control, potential misfires may be reduced. Further, by fueling outside the flammability limits, potential misfires from accidental sparks may also be reduced. By adjusting the fuel injection profile to maintain stoichiometric exhaust, engine shutdown may be expedited without adversely affecting the quality of exhaust emissions. Further, by adjusting the fuel injection of a restart based on the injection profile of a preceding expedited engine shutdown, the quality of the restart may be improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    during an automatic engine idle-stop of an engine coupled through a torque converter to an automatic transmission, turning off spark;
    operating a first cylinder with a rich air-fuel ratio richer than a rich flammability limit;
    operating a second cylinder with a lean air-fuel ratio leaner than a lean flammability limit; and
    mixing un-combusted exhaust from the first and second cylinders with exhaust, the exhaust mixture being substantially stoichiometric; and
    selectively reactivating the engine during an engine restart condition.

2. The method of claim 1, further comprising, adjusting a throttle to bring manifold pressure toward barometric pressure.

3. The method of claim 2, wherein adjusting the throttle includes, increasing throttle opening during the engine idle-stop.

4. The method of claim 2, further comprising, engaging a starter without applying starter current to the engine while spinning to brake the engine.

5. The method of claim 1, wherein a leanness and/or richness outside flammability limits is adjusted based on a number of combustion events available before engine stop.

6. The method of claim 5, wherein operating the first and second cylinders includes fueling the first cylinder richer than the rich flammability limit, and fueling the second cylinder leaner than the lean flammability limit.

7. The method of claim 1, further comprising, during an engine restart from the idle-stop, cranking the engine with a starter, and adjusting fuel injection to the first and second cylinders based on whether fueling outside flammability limits occurred on an immediately preceding idle-stop.

8. A method of expediting engine spin-down, comprising:
    during an idle-stop engine spin-down where the engine is shutdown,
        engaging a starter without applying starter current, to apply an anti-reversal torque on the engine, turning off spark, and injecting fuel into one or more engine cylinders outside flammability limits of each cylinder based on a number of combustion events before the engine stop; and
    restarting the engine during restart conditions.

9. The method of claim 8, wherein injecting fuel outside flammability limits includes fueling lean cylinders leaner than a lean flammability limit, and rich cylinders richer than a rich flammability limit.

10. The method of claim 9, wherein a degree of leanness and a degree of richness, outside flammability limits, is adjusted based on engine operating conditions, including a number of cylinders operating lean and number of cylinders operating rich.

11. The method of claim 9, wherein the fuel injections are adjusted to maintain exhaust air-fuel ratio at stoichiometry.

12. The method of claim 9, further comprising, adjusting a throttle to bring MAP toward BP.

13. The method of claim 12, wherein the adjustment includes increasing a throttle opening during the idle-stop.

14. The method of claim 9 further comprising, during the engine restart, cranking the engine with the starter, and adjusting fuel injection to the cylinders based on whether an immediately preceding idle-stop included fueling outside flammability limits.

15. A vehicle system, comprising,
    an engine with a plurality of cylinders coupled through a torque converter to an automatic transmission;
    a starter; and
    a control system having computer readable storage medium with code therein, the code carrying instructions for, during engine idle-stop conditions,
  engaging a starter without applying starter current to apply an anti-reversal torque on the engine;
  turning off spark;
  adjusting a throttle to bring MAP toward BP;
  operating a first cylinder with an air to injected fuel ratio richer than a rich flammability limit; and
  operating a second cylinder with an air to injected fuel ratio leaner than a lean flammability limit, wherein the ratio of a total air in the first and second cylinders, to a total injected fuel in the first and second cylinders, is substantially stoichiometric.

16. The system of claim 15, wherein the control system further comprises code with instructions for selectively restarting the engine during an engine restart condition, an amount of fuel injected into the cylinders during the restart adjusted based on whether fuel injected into the cylinders during an immediately preceding idle-stop was outside the flammability limits.

17. The system of claim 16, wherein the adjustment includes, fueling cylinders that were rich injected during the preceding idle-stop less rich during the following restart, and fueling cylinders that were lean injected during the preceding idle-stop more rich during the following restart.

18. The system of claim 15, wherein a degree of leanness and/or richness outside the flammability limits is adjusted based at least on a number of cylinders operating lean, a number of cylinders operating rich, and/or a number of predicted events before engine stop.

* * * * *